United States Patent
Osawa

(10) Patent No.: US 11,277,080 B2
(45) Date of Patent: Mar. 15, 2022

(54) VIBRATION TYPE MOTOR AND OPTICAL APPARATUS

(71) Applicant: CANON KABUSHIKI KAISHA, Tokyo (JP)

(72) Inventor: Kazuharu Osawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/099,549

(22) Filed: Nov. 16, 2020

(65) Prior Publication Data

US 2021/0159814 A1    May 27, 2021

(30) Foreign Application Priority Data

Nov. 27, 2019  (JP) .............................. JP2019-214302

(51) Int. Cl.
| | | |
|---|---|---|
| *H02N 2/00* | (2006.01) | |
| *H02N 2/02* | (2006.01) | |
| *G02B 7/08* | (2021.01) | |

(52) U.S. Cl.
CPC ............ *H02N 2/0065* (2013.01); *G02B 7/08* (2013.01); *H02N 2/0055* (2013.01); *H02N 2/026* (2013.01)

(58) Field of Classification Search
CPC .... H02N 2/0065; H02N 2/0055; H02N 2/026; G02B 7/08
See application file for complete search history.

(56) References Cited

U.S. PATENT DOCUMENTS

| | | | | |
|---|---|---|---|---|
| 8,004,151 | B2* | 8/2011 | Mukae | H02N 2/103 |
| | | | | 310/323.02 |
| 10,243,486 | B2* | 3/2019 | Ninomiya | H02N 2/026 |
| 2021/0058010 | A1* | 2/2021 | Iwazaki | H01L 41/042 |

FOREIGN PATENT DOCUMENTS

JP        2007-121084 A     5/2007

* cited by examiner

*Primary Examiner* — Emily P Pham
(74) *Attorney, Agent, or Firm* — Canon U.S.A., Inc. I.P. Division

(57) ABSTRACT

In a vibration type motor, a vibrator unit including a vibrator configured to vibrate, and a friction member unit including a friction member which the vibrator contacts relatively moving in a first direction. The vibrator unit is displaceable relative to the friction member unit in a second direction orthogonal to the first direction, and presses the vibrator against the friction member in the second direction. The friction member unit includes a stopper that contacts the vibrator unit so as to restrict the vibration unit from displacing, by an amount exceeding a predetermined amount, in the second direction. The stopper extends in the first direction, a distance greater than a length, in the first direction, of an area of the friction member which the vibrator contacts, and the stopper projects from the friction member toward the vibrator in the second direction when viewed from the first direction.

7 Claims, 5 Drawing Sheets

VIBRATION TYPE MOTOR AND OPTICAL APPARATUS

BACKGROUND

Field of the Disclosure

The present disclosure generally relates to a vibration type motor used to drive a lens, etc.

Description of the Related Art

In a vibration type motor used to drive a lens in an optical apparatus, such as an image pickup apparatus, a piezoelectric element excites vibrations in a vibrator to generate an elliptical motion at a tip of a projection of the vibrator and to cause relative driving between the vibrator and a friction member that is brought into pressure contact with the projection. However, in such a vibration type motor, the vibrator and the friction member can wear and generate abrasion powder (wear debris). This abrasion powder may adhere to the lens or the image sensor.

Japanese Patent Laid-Open No. ("JP") 2007-121084 discloses a vibration type motor that prevents abrasion powder from flowing out of a cover by covering the periphery of the vibrator with the cover and by disposing a sealing member between the vibrator and the friction member.

However, if the periphery of the vibrator is covered with the cover as disclosed in JP 2007-121084, the vibration type motor becomes larger. Further, dedicated components, such as the cover and the sealing member, are necessary to prevent the abrasion powder from flowing out.

SUMMARY

The present disclosure includes a compact vibration type motor and an optical apparatus having the same, each of which can suppress the outflow of abrasion powder.

A vibration type motor according to the present disclosure includes a vibrator unit including a vibrator configured to vibrate, and a friction member unit including a friction member which the vibrator contacts, the vibrator unit and the friction member unit move relative to each other in a first direction. The vibrator unit is displaceable relative to the friction member unit in a second direction orthogonal to the first direction, and is configured to press the vibrator against the friction member in the second direction. The friction member unit includes a stopper that contacts the vibrator unit so as to restrict the vibration unit from displacing, by an amount exceeding a predetermined amount, in the second direction. The stopper extends in the first direction, a distance greater than a length, in the first direction, of an area of the friction member which the vibrator contacts, and the stopper projects from the friction member toward the vibrator in the second direction when viewed from the first direction.

An optical apparatus including the above vibration type motor also constitutes another aspect of the present disclosure.

Further features of the present disclosure will become apparent from the following description of exemplary embodiments with reference to the attached drawings.

DESCRIPTION OF THE EMBODIMENTS

Referring now to the accompanying drawings, a description will be given of embodiments according to the present disclosure.

First Embodiment

Figure 1:
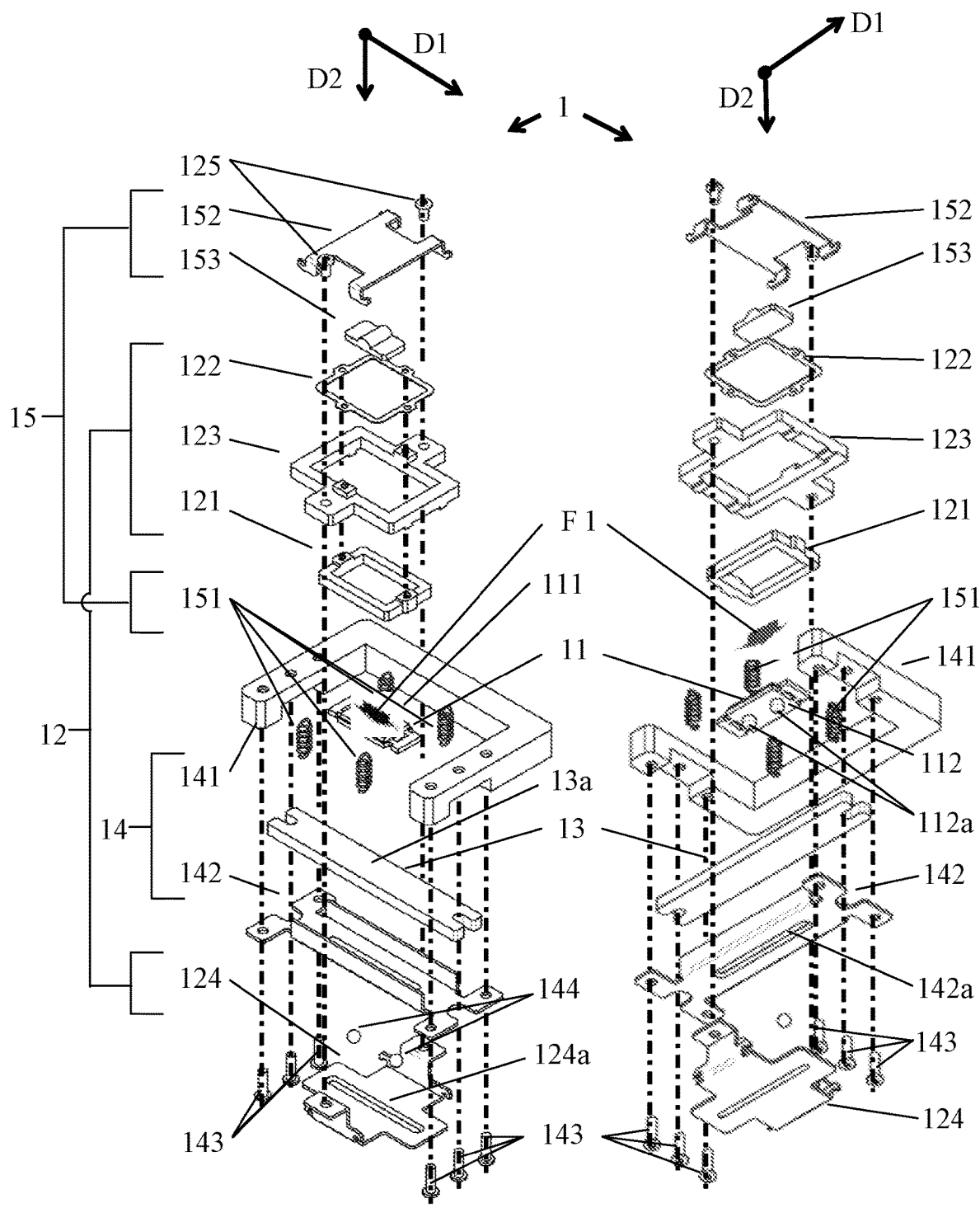
FIG. 1 is an exploded perspective view of a vibration type motor according to a first embodiment of the present disclosure.
Figure 2A:
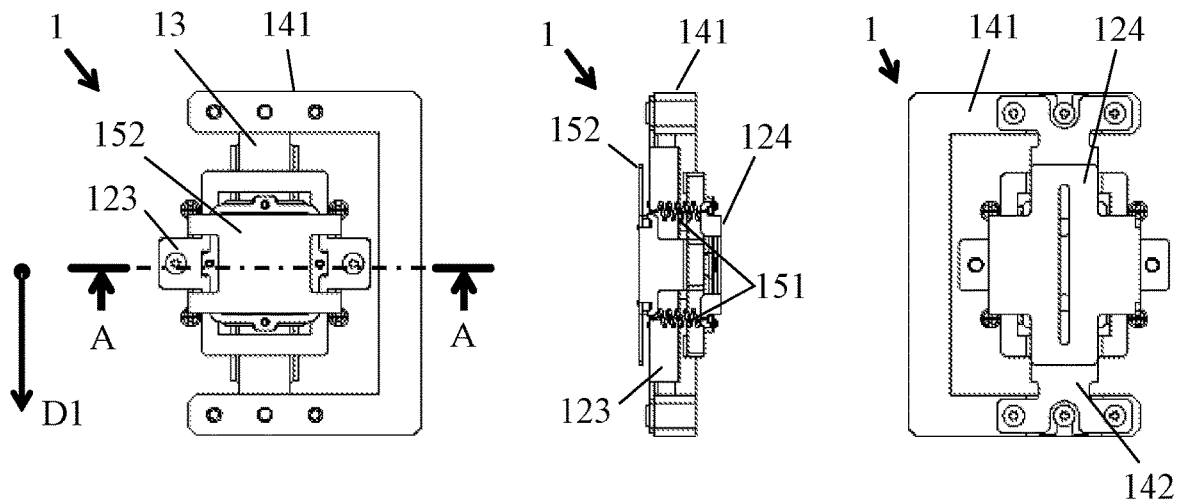
FIGS. 2A to 2C illustrate assembled states of the vibration type motor according to the first embodiment.
Figure 2B:
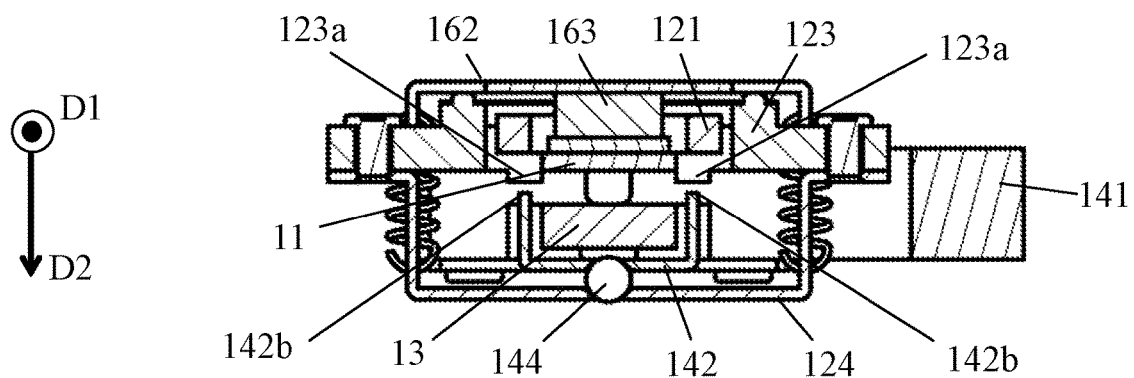
Figure 2C:
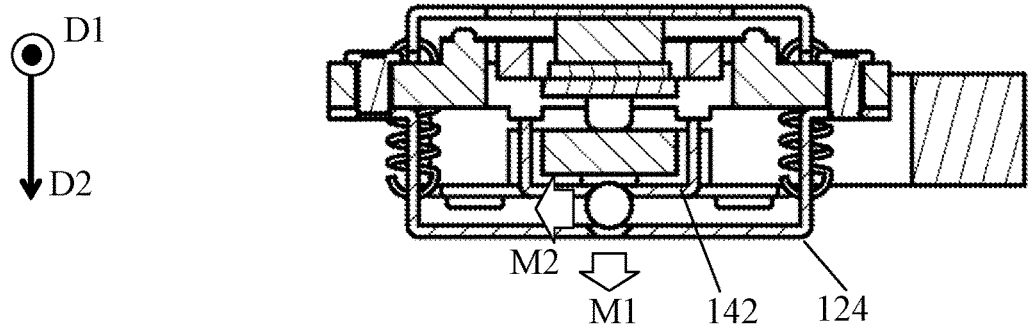

FIGS. 1 and 2A to 2C illustrate the configuration of a vibration type motor 1 according to a first embodiment of the present disclosure. FIG. 1 is an exploded view of the vibration type motor 1. The left view illustrates the configuration of the vibration type motor 1 viewed from the diagonally upper side, and the right view illustrates the configuration of the vibration type motor 1 viewed from the diagonally lower side. FIG. 2A illustrates top, side, and bottom views of the vibration type motor 1 in an assembled state, and FIGS. 2B and 2C illustrate a cross section taken along a line A-A in FIG. 2A. The following description illustrates the material, shape, and specific name of each component, but other materials, shapes, and members can be used.

The vibration type motor 1 includes a vibrator 11, a vibrator holder 12 that holds the vibrator 11, a friction member 13, a friction member holder 14 that holds the friction member 13, and a pressurizing unit 15 that generates a pressurizing force F1 that brings the vibrator 11 into pressure contact with the friction member 13. In this vibration type motor 1, the vibrator unit including the vibrator 11, the vibrator holder 12, and the pressurizing unit 15 moves in the first direction labelled by D1 in FIG. 1 relative to the friction member unit including the friction member 13 and the friction member holder 14. The vibrator 11 is brought into pressure contact with the friction member 13 in a second direction D2 orthogonal to the first direction D1 by the pressurizing force F1. The friction member unit may move relative to the vibrator unit. That is, the vibrator unit and the friction member unit may relatively move.

The vibrator 11 is configured by laminating a plate-shaped piezoelectric element (electro-mechanical energy conversion element) 111 and an elastic member 112 having two protrusions 112a. The piezoelectric element 111 is a PZT (piezoelectric element), and the elastic member 112 is a metal plate. When the two-phase AC voltage is applied to the piezoelectric element 111 to excite vibrations in the vibrator 11 (elastic member 112), an elliptical motion can be generated at the tips of the protrusions 112a.

The vibrator holder 12 includes a vibrator holding frame 121, a connecting plate 122, a movable frame 123, and a movable guide member 124. The vibrator holding frame 121 is a resin frame, is directly bonded to the vibrator 11, and thereby holds the vibrator 11. The connecting plate 122 and the movable frame 123 are a thin metal plate and a resin frame, respectively. By connecting the vibrator holding frame 121 and the movable frame 123 with the connecting plate 122, the vibrator 11 and the vibrator holding frame 121 are held movably in the second direction D2 relative to the movable frame 123 and held steadily in the first direction D1. The movable guide member 124 is metal and has a guide groove portion 124a. The movable frame 123 and the movable guide member 124 are fastened with screws 125.

The friction member 13 is a metal plate and is brought into frictional contact with the protrusions 112a of the vibrator 11 on a sliding surface 13a. The friction member holder 14 includes a base member 141 and a fixed guide member 142. The base member 141 is a resin housing. The friction member 13 and the fixed guide member 142 are fixed onto the base member 141 with screws 143. The fixed guide member 142 is metal and has a guide groove portion 142a. Two rolling balls (rolling members) 144 are sandwiched between the guide groove portion 124a in the movable guide member 124 and the guide groove portion 142a in the fixed guide member 142 described above. With this configuration, the vibrator holder 12 is held movably relative to the friction member holder 14 in the first direction D1.

The pressurizing unit 15 includes a plurality of (four in this embodiment) pressurizing force generators 151, a pressurizing plate 152, and a pressurizing force transmitting member 153. The pressurizing force generators 151 and the pressurizing plate 152 are tension springs and a metal plate, respectively. The tension spring as the pressurizing force generator 151 generates the pressurizing force F1 in a compressed (contracted) direction, when its one end is connected to the movable guide member 124 and its other end is connected to the pressurizing plate 152 in a stretched state. The pressurizing force transmitting member 153 is configured by attaching a cushioning material such as felt to a surface of the resin block on the vibrator 11 side. The pressurizing force F1 generated by the pressurizing force generator 151 is transmitted to the vibrator 11 via the pressurizing plate 152 and the pressurizing force transmitting member 153. Since the vibrator 11 is movably held in the second direction D2, the projection 112a of the vibrator 11 is brought into pressure contact with the sliding surface 13a of the friction member 13 by the pressurizing force F1.

In the thus-structured vibration type motor 1, when the elliptical motion is generated in the protrusions 112a of the vibrator 11 as described above, a driving force is generated between the protrusion 112a and the friction member 13. Thereby, the vibrator unit can be driven in the first direction D1 relative to the friction member unit.

FIG. 2B illustrates a cross section of the vibration type motor 1 in a normal state, and FIG. 2C illustrates a cross section of the vibration type motor 1 in a state where an external impact is applied. When the impact is applied as illustrated in FIG. 2C, the movable guide member 124 is displaced in a direction M1 in which the movable guide member 124 is separated from the fixed guide member 142 in the second direction D2. Thereby, when an interval increases between the movable guide member 124 and the fixed guide member 142 in the second direction D2, the rolling balls 144 sandwiched between the movable guide member 124 and the fixed guide member 142 shift in a lateral direction M2 and may drop off from the guide groove portions 124a and 142a.

In order to prevent the rolling balls 144 from dropping off, the vibration type motor 1 according to this embodiment provides a first stopper 123a to the movable frame 123 of the vibrator holder 12 as illustrated in FIG. 2B, and a second stopper 142b to the fixed guide member 142 of the friction member holder 14. When the impact is applied, the first stopper 123a and the second stopper 142b contact each other in the second direction D2, so that the vibrator holder 12 (or the vibrator unit) can be prevented from displacing by an amount exceeding a predetermined amount in the second direction D2 and thereby the rolling balls 144 can be prevented from dropping off.

In the thus-structured vibration type motor 1, abrasion powder may be generated in a vibrator sliding area on the sliding surface of the friction member 13 in which the vibrator 11 (protrusions 112a) slides. If there is a linear path connecting the vibrator sliding area to the outside of the vibration type motor 1, the abrasion powder may flow out to the outside. In order to prevent the abrasion powder from flowing out to the outside, the vibration type motor 1 according to this embodiment has the following structure.

Figure 3A:
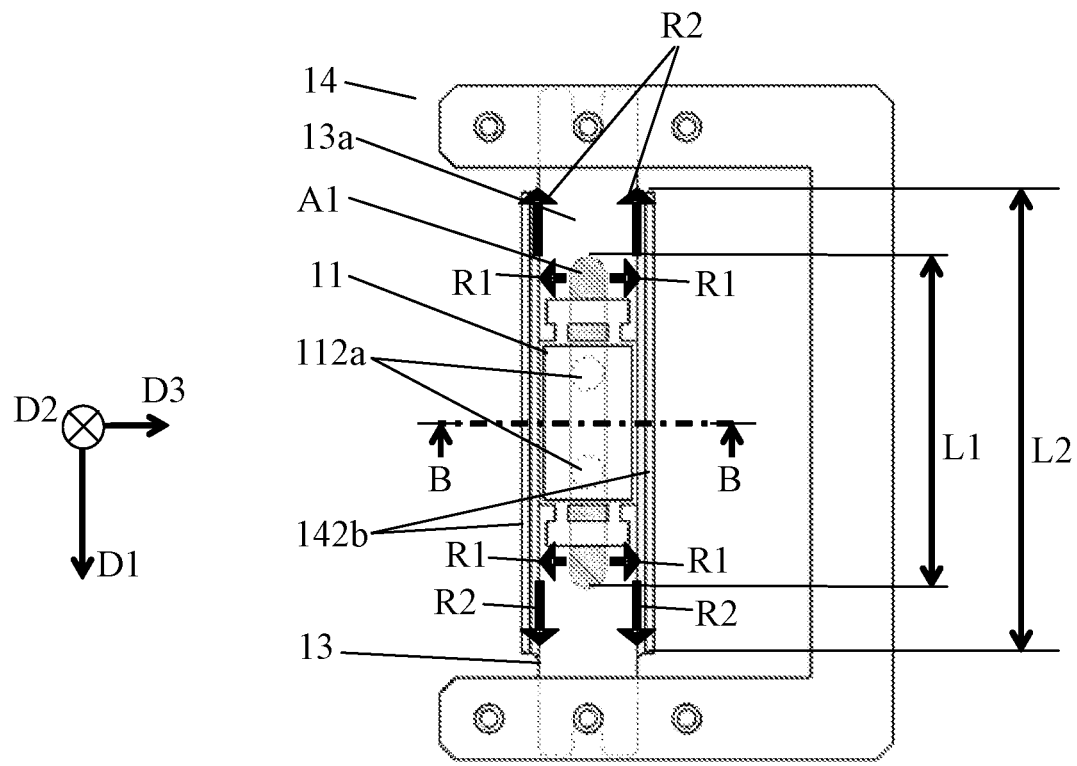
FIGS. 3A and 3B views illustrating characteristics of a vibration type motor according to a second embodiment of the present disclosure.
Figure 3B:
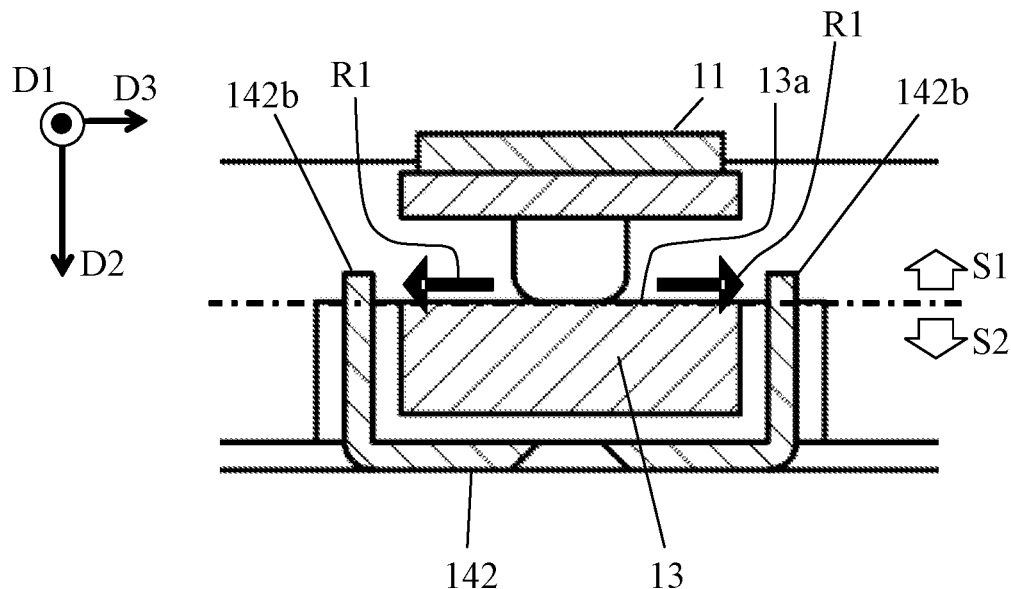

FIG. 3A illustrates the vibrator 11, the friction member 13, and the friction member holder 14 viewed from the second direction D2. FIG. 3B illustrates a cross section of the vibrator 11, the friction member 13, and the friction member holder 14 (cross section taken along a line B-B in FIG. 3A) viewed from the first direction D1. As illustrated in these drawings, the second stopper 142b of the fixed guide member 142 described above is located adjacent to the friction member 13 on both sides of the friction member 13 (sliding surface 13a) in the third direction D3 orthogonal to the first direction D1 (and the second direction D2).

As illustrated in FIG. 3A, a length L2 of the second stopper 142b in the first direction D1 is set longer than a length L1 of the vibrator sliding area A1 of the sliding surface 13a of the friction member 13. Further, as illustrated in FIG. 3B, when the internal area of the vibration type motor 1 is divided into a vibrator side S1 and a friction member side S2 of the sliding surface 13a as a boundary in the second direction D2, the second stopper 142b extends from the friction member side S2 to the vibrator side S1. In other words, the second stopper 142b projects toward the vibrator S1 longer than the sliding surface 13a (vibrator sliding area A1).

When the vibrator 11 moves on the friction member 13 in the first direction D1, abrasion powder is generated in the vibrator sliding area A1 of the sliding surface 13a, and most of the generated abrasion powder flows out to the outside of the vibration type motor 1 along a path R1 that extends in the third direction (width direction) D3 orthogonal to the first and second directions D1 and D2 on the sliding surface 13a. However, in this embodiment, the path R1 is blocked by a portion of the second stopper 142b that projects toward the vibrator side S1, and thus the abrasion powder can be prevented from flowing out of the path R1. Generally, the abrasion powder is as large as several microns to several tens of microns, so that the abrasion powder that contacts another member is adsorbed to the other member by electrostatic force. In this embodiment, most of the generated abrasion powder adheres to the friction member 13 and the second stopper 142b. Thus, the abrasion powder can be restrained from flowing to the outside.

This embodiment restrains abrasion powder from flowing out to the outside using the second stopper 142b provided to prevent the rolling balls 144 from dropping off. This structure does not need a dedicated member to suppress the outflow of abrasion powder or a space for providing the dedicated member, and thereby can prevent the vibration type motor 1 from becoming larger.

As described above, this embodiment can realize a compact vibration type motor 1 that can restrain abrasion powder generated between the vibrator 11 and the friction member 13 from flowing out to the outside.

The second stopper 142a may not be adjacently located on both sides of the friction member 13 in the third direction D3 as described above, as long as it blocks the outflow of abrasion powder from the path R1.

Further, the second stopper 142a can be provided only by bending the fixed guide member 142 extending in the first direction D1. Thus, the space for disposing the second stopper 142a can be made smaller.

Second Embodiment

Next follows a description of a vibration type motor 2 according to a second embodiment of the present disclosure. Similar to the vibration type motor 1 according to the first embodiment, the vibration type motor 2 according to this embodiment includes a vibrator 21, a vibrator holder 22, a friction member 23, a friction member holder 24, and a pressuring unit 25. Further, similar to the first embodiment, the vibrator 21 includes a piezoelectric element 211 and an elastic member 212. The vibrator holder 22 includes a vibrator holding frame 221, a connecting plate 222, a movable frame 223, and a movable guide member 224. The friction member holder 24 includes a base member 241 and a fixed guide member 242. The pressuring unit 25 includes a pressurizing force generator 251, a pressurizing plate 252, and a pressurizing force transmitting member 253.

Figure 4A:
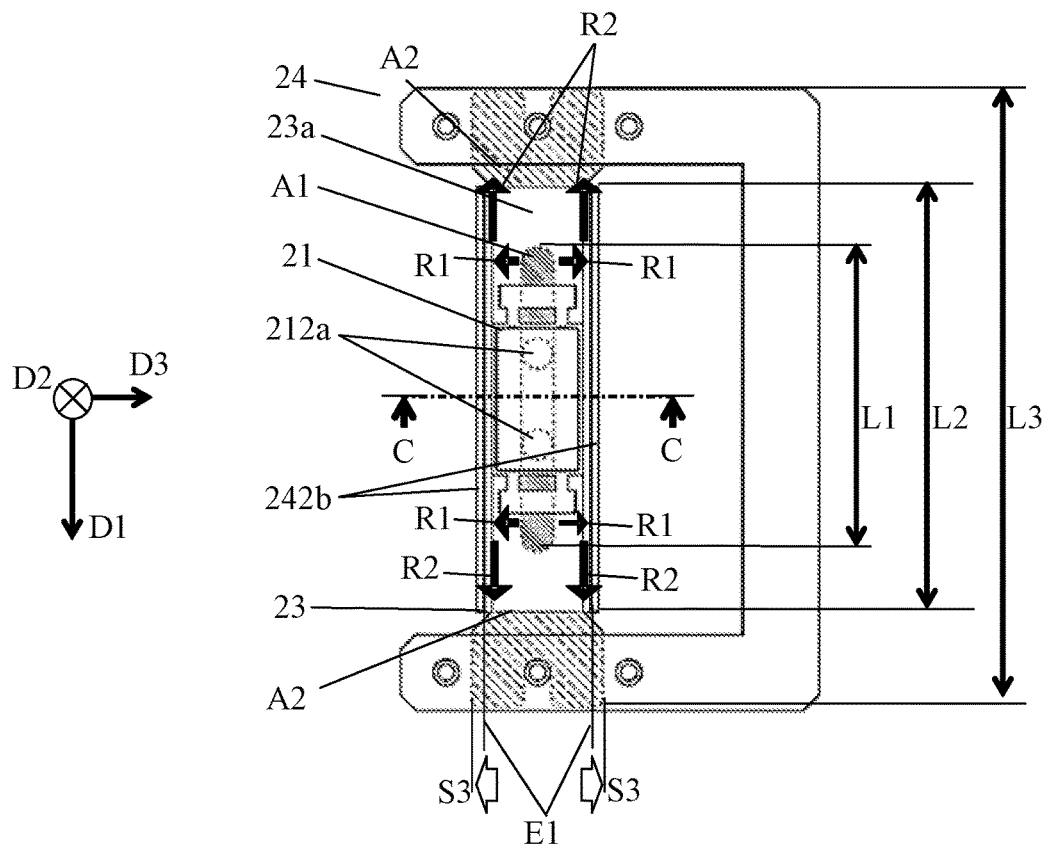
FIGS. 4A and 4B are other views illustrating the characteristics of the vibration type motor according to the second embodiment.
Figure 4B:
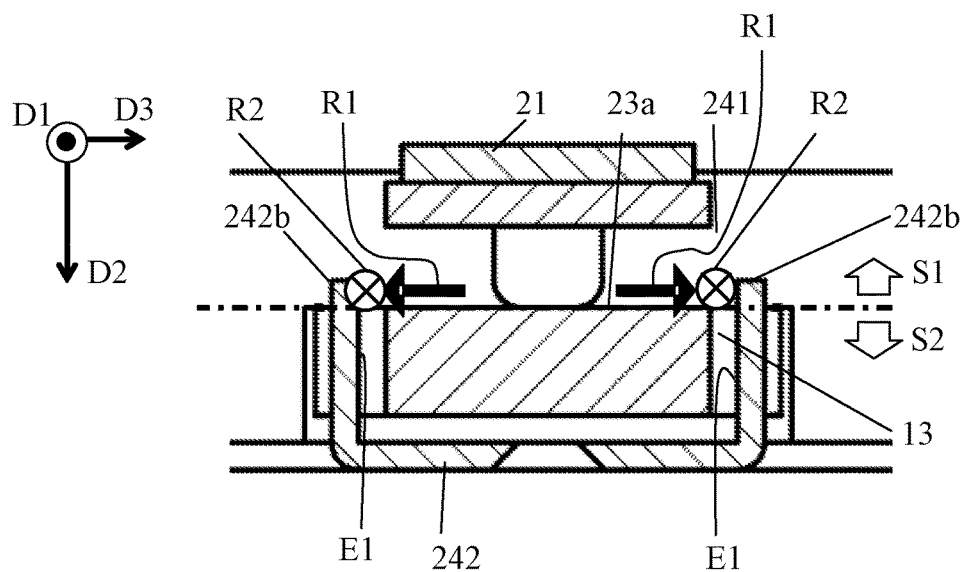

FIG. 4A illustrates the vibrator 21, the friction member 23, and the friction member holder 24 viewed from the second direction D2. FIG. 4B illustrates a cross section (cross section taken along a line C-C in FIG. 4A) of the vibrator 21, the friction member 23, and the friction member holder 24 viewed from the first direction D1. Similar to the first embodiment, the second stoppers 242b of the fixed guide member 242 are disposed adjacent to the friction member 13 on both sides of the friction guide 23 (sliding surface 23a) in the third direction D3 orthogonal to the first direction D1 (and the second direction D2). Further, as illustrated in FIG. 4A, the length L2 of the second stopper 242b in the first direction D1 is set longer than the length L1 of the vibrator sliding area A1 of the sliding surface 23a in the friction member 23.

Similar to the first embodiment, as illustrated in FIG. 4B, when the internal area of the vibration type motor 2 is divided into the vibrator side S1 and the friction member side S2 of the sliding surface 23a as the boundary in the second direction D2, the second stopper 242b extends from the friction member side S2 to the vibrator side S1. That is, the second stopper 242b projects toward the vibrator side S1 longer than the sliding surface 23a (vibrator sliding area A1). Similar to the first embodiment, this structure can suppress the outflow to the outside of abrasion powder generated between the vibrator 21 and the friction member 23.

However, in this embodiment, an overall length L3 of the friction member 23 in the first direction D1 is longer than the length L2 of the second stopper 242b. Thus, the friction member 23 has an area A2 to which the second stopper 242b is not adjacent in the third direction D3. In this area A2, the friction member 23 extends to a position S3 outside the inner end surface (end surface on the friction member side) E1 on both sides of the second stopper 242b in the third direction D3. That is, the friction member 23 in the area A2 is wider than the friction member 23 in the vibrator sliding area A1.

In the vibration type motor 1 according to the first embodiment, most abrasion powder adheres to the second stopper 142b by the electrostatic force as described above, but abrasion powder that has adhered to the second stopper 142b when the impact is applied to the vibration type motor 1 may be separated from the second stopper 142b and flow out to the outside of the vibration type motor 1 from an opening end of the second stopper 142b in the first direction D1 as illustrated by a path R2 in FIG. 3A.

On the other hand, in the vibration type motor 2 according to this embodiment, as described above, the friction member 23 in the area A2 is wider than the friction member 23 in the vibrator sliding area A1, the path R2 is blocked by the base member 241 and the friction member 23 as illustrated in FIG. 4B. As a result, this structure can prevent the abrasion powder separated from the second stopper 242b from flowing out to the outside of the vibration type motor 2 through the path R2. Thus, the vibration type motor 2 according to this embodiment has a structure that is more effective in suppressing the outflow of abrasion powder than that of the vibration type motor 1 according to the first embodiment.

Third Embodiment

Figure 5A:
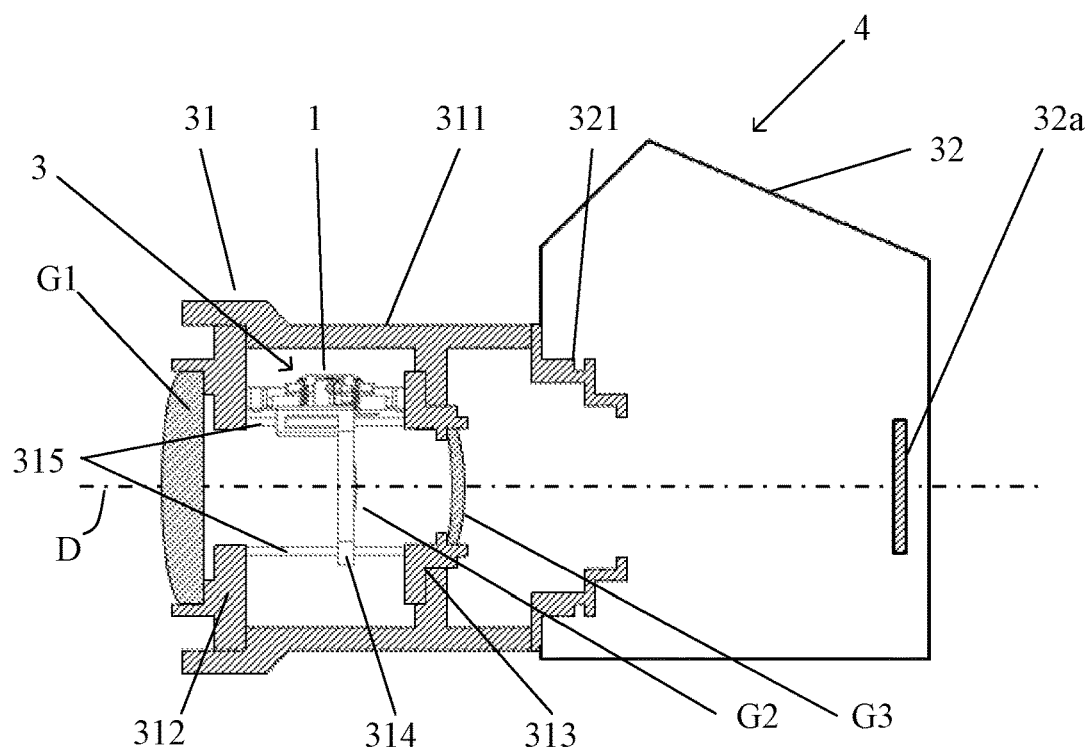
FIGS. 5A and 5B illustrate an optical apparatus according to a third embodiment of the present disclosure.
Figure 5B:
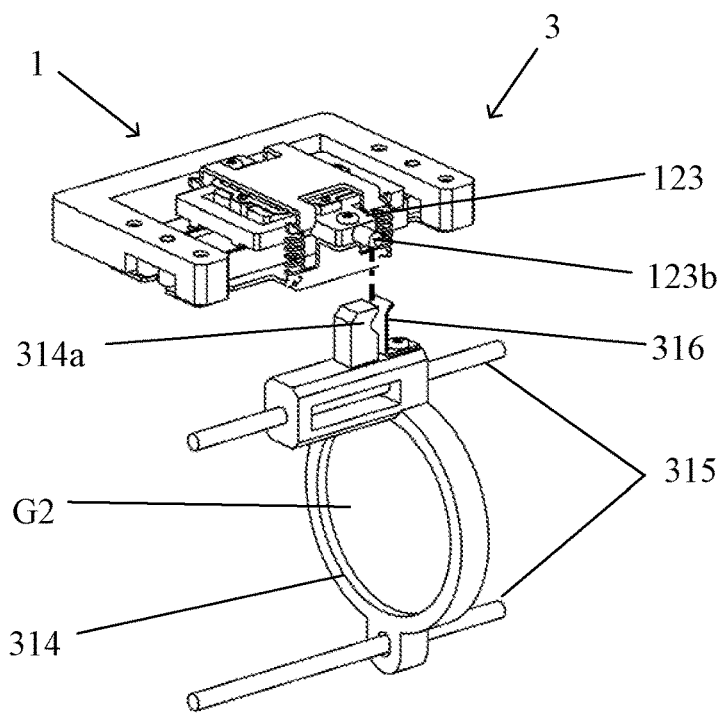

Next follows a description of a camera (image pickup apparatus) as an optical apparatus according to a third embodiment according to the present disclosure. FIG. 5A illustrates a cross section of a camera 4 according to this embodiment. FIG. 5B illustrates a structure of a lens driving apparatus 3 mounted on a lens barrel 31 of the camera 4 according to this embodiment and including the vibration type motor 1 according to the first embodiment.

A fixed barrel 311 of the lens barrel 31 is fixed to a mount 321 of a camera body 32 with unillustrated screws. An image sensor 32a configured to capture an object image is provided in the camera body 32.

A front barrel 312 that holds a first lens G1 and a rear barrel 313 that holds a third lens G3 are fixed to the fixed barrel 311. A second lens (optical element) G2 held by a lens holding frame 314 is disposed between the first lens G1 and the third lens G3 in the fixed barrel 311.

The lens holding frame 314 is held movably in a direction in which an optical axis D extends (optical axis direction) by two guide bars 315 whose both ends are held by the front lens barrel 312 and the rear lens barrel 313. The vibration type motor 1 is fixed onto the rear lens barrel 313 with unillustrated screws.

The movable frame 123 of the vibration type motor 1 is provided with a driving force transmitter 123b that transmits a driving force generated by the vibration type motor 1 to a lens holding frame 314. The lens holding frame 314 is provided with an engagement groove portion 314a that is engaged with the driving force transmitter 123b, and a biasing spring 316 that biases the driving force transmitter 123b toward the engagement groove portion 314a. The movable frame 123 and the lens holding frame 314 are connected to each other when the driving force transmitter 123b is engaged with the engaging groove portion 314a by the biasing force of the biasing spring 316.

Therefore, when the vibration type motor 1 is driven, its driving force is transmitted to the lens holding frame 314 via the movable frame 123 and the driving force transmitter 123b. Thereby, the lens holding frame 314 (second lens G2) moves in the optical axis direction while guided by the guide bars 315.

Using the vibration type motor 1 according to the first embodiment for the lens driving apparatus 3 can realize the compact camera 4 that restrains abrasion powder from adhering to the lenses G1 to G3 and the image sensor 32a.

The lens driving apparatus 3 may use the vibration type motor 2 according to the second embodiment instead of the vibration type motor 1.

While the lens integrated camera equipped with the lens driving apparatus has been described in this embodiment, the lens driving apparatus may be mounted on an interchangeable lens as an optical apparatus.

The above embodiment can realize a compact vibration type motor that can suppress the outflow to the outside of abrasion powder generated between the vibrator and the friction member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-214302, filed on Nov. 27, 2019 which is hereby incorporated by reference herein in its entirety.

What is claimed is:

1. A vibration type motor comprising:
   a vibrator unit including a vibrator configured to vibrate; and
   a friction member unit including a friction member which the vibrator contacts, the vibrator unit and the friction member unit move, relative to each other, in a first direction,
   wherein the vibrator unit is displaceable relative to the friction member unit in a second direction orthogonal to the first direction, and is configured to press the vibrator against the friction member in the second direction,
   wherein the friction member unit includes a stopper that contacts the vibrator unit so as to restrict the vibration unit from displacing, by an amount exceeding a predetermined amount, in the second direction, and
   wherein the stopper extends in the first direction, a distance greater than a length, in the first direction, of an area of the friction member which the vibrator contacts, and the stopper projects from the friction member toward the vibrator in the second direction when viewed from the first direction.

2. The vibration type motor according to claim 1, wherein the stopper is provided on both sides of the friction member in a third direction orthogonal to the first and second directions.

3. The vibration type motor according to claim 1, wherein the stopper is provided so as to block a path through which abrasion powder, generated by the contact between the vibrator and the friction member, flows to outside of the vibration type motor.

4. The vibration type motor according to claim 1, further comprising a guide member configured to guide a relative movement between the friction member unit and the vibrator unit, and the stopper is provided to the guide member.

5. The vibration type motor according to claim 4, wherein the guide member has a guide groove portion extending in the first direction, and
   wherein the vibration type motor further comprises a rolling member configured to roll due to the relative movement between the vibrator unit and the friction member unit and which is engaged with the guide groove portion.

6. The vibration type motor according to claim 1, wherein a length of the friction member in the first direction is greater than a length of the stopper in the first direction, and
   wherein a portion of the friction member that extends longer than the stopper in the first direction is located outside an end surface of the stopper on a friction member side in a third direction orthogonal to the first and second directions.

7. An optical apparatus comprising:
   a vibration type motor; and
   an optical element driven by the vibration type motor,
   wherein the vibration type motor includes:
   a vibrator unit including a vibrator configured to vibrate; and
   a friction member unit including a friction member which the vibrator contacts, the vibrator unit and the friction member unit move, relative to each other, in a first direction,
   wherein the vibrator unit is displaceable relative to the friction member unit in a second direction orthogonal to the first direction, and is configured to press the vibrator against the friction member in the second direction,
   wherein the friction member unit includes a stopper that contacts the vibrator unit so as to restrict the vibration unit from displacing, by an amount exceeding a predetermined amount, in the second direction, and
   wherein the stopper extends in the first direction, a distance greater than a length, in the first direction, of an area of the friction member which the vibrator contacts, and the stopper projects from the friction member toward the vibrator in the second direction when viewed from the first direction.

* * * * *